(12) United States Patent
Chao et al.

(10) Patent No.: US 6,530,660 B1
(45) Date of Patent: Mar. 11, 2003

(54) EYEGLASS FRAME WITH A REVERSIBLE ARM

(75) Inventors: David Chao, Los Altos, CA (US); Chi-Pei Cheng, Los Altos, CA (US)

(73) Assignee: Contour Optik, Inc., Chiayi (TW)

( * ) Notice: Subject to any disclaimer, the term of this patent is extended or adjusted under 35 U.S.C. 154(b) by 0 days.

(21) Appl. No.: 09/931,693

(22) Filed: Aug. 16, 2001

(51) Int. Cl.$^7$ ............... G02C 5/08; G02C 5/14
(52) U.S. Cl. ............... 351/63; 351/153; 2/454; 16/228
(58) Field of Search ............... 351/63, 153, 111, 351/119, 118, 115, 41; 2/454; 16/228

(56) References Cited

U.S. PATENT DOCUMENTS

| | | |
|---|---|---|
| 2,166,110 A | 7/1939 | Baldanza |
| 2,275,999 A | 3/1942 | Strauss |
| 2,307,419 A | 1/1943 | McNeill et al. |
| 2,537,248 A | 1/1951 | Vigano |
| 3,476,466 A * | 11/1969 | Hopkins ............ 351/153 |
| 3,533,687 A * | 10/1970 | Herzig ............ 351/153 |
| 4,720,186 A | 1/1988 | Douillard |
| 4,887,896 A | 12/1989 | Akagi |
| 5,187,504 A | 2/1993 | Kanda |
| 5,208,616 A | 5/1993 | Chang |
| 5,448,317 A | 9/1995 | Huang |
| 5,532,766 A | 7/1996 | Mateer et al. |
| 5,576,776 A | 11/1996 | Scheller |
| 5,638,146 A | 6/1997 | Nannini |
| 5,640,218 A | 6/1997 | Kanda |
| 5,896,185 A | 4/1999 | Huang |
| 5,929,966 A | 7/1999 | Conner |
| 6,048,062 A | 4/2000 | Chow |
| 6,102,541 A | 8/2000 | Kuo |
| 6,257,720 B1 | 7/2001 | Ozawa |

FOREIGN PATENT DOCUMENTS

| | | |
|---|---|---|
| EP | 0512173 A1 | 5/1991 |
| EP | 0151826 A1 | 4/1992 |
| JP | 2000-131651 | 5/2000 |
| WO | WO/89/06822 | 7/1989 |

* cited by examiner

*Primary Examiner*—Hung Xuan Dang

(57) ABSTRACT

The present invention is directed to eyeglasses provided with at least one reversible arm that can be manipulated to fold in towards the outer (front) face of the lens retaining portion of the frame, thereby covering it. The arm can be attached to the frames in a variety of ways. For instance, the attachment can be mechanical, or magnetism may be employed in fixing the arm to the frame. Several structural arrangements are described that permit reversal of the arm from a position behind the lens retaining portion of the frame to a position in front thereof. The arm can then be folded to cover the front and back sides of the lenses.

87 Claims, 9 Drawing Sheets

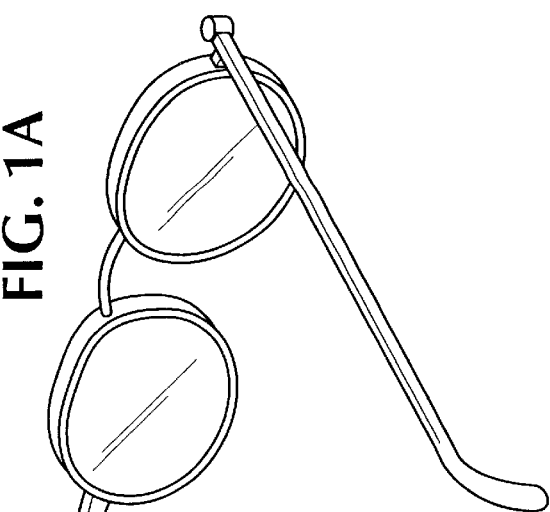
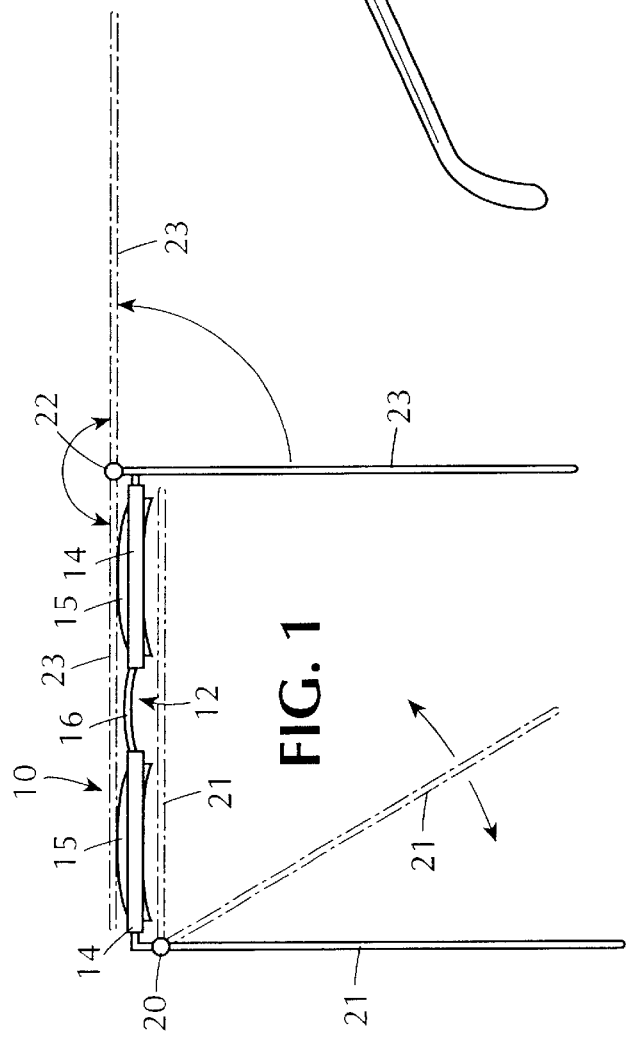
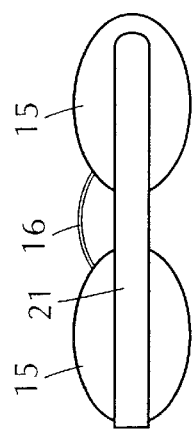
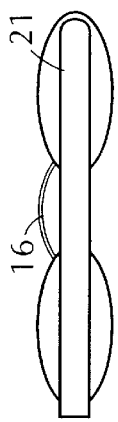

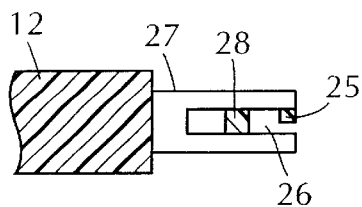
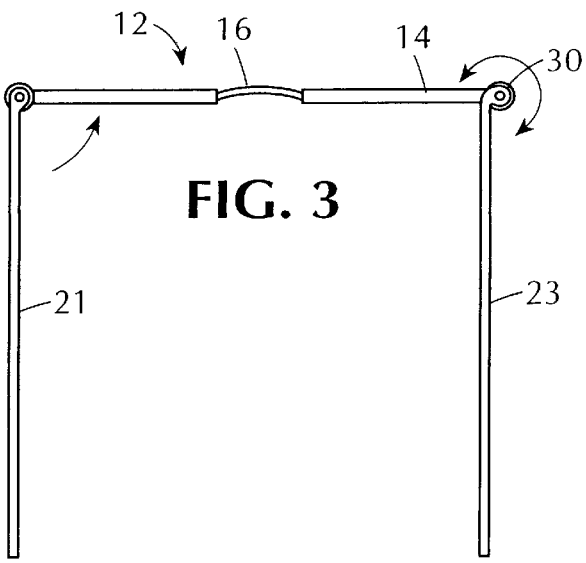
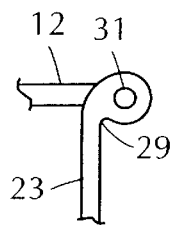
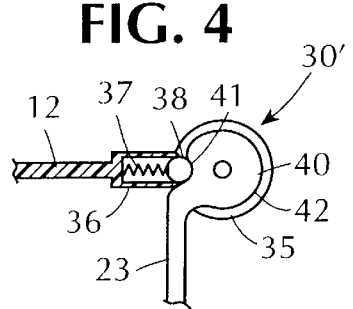
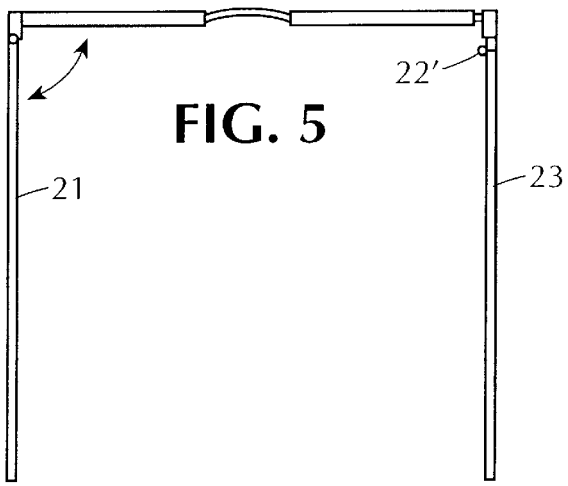
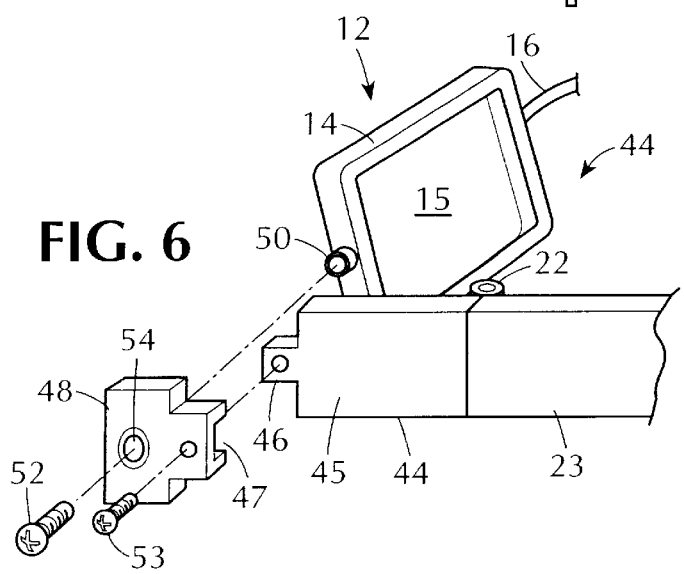
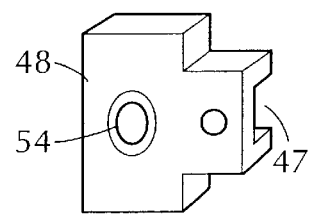

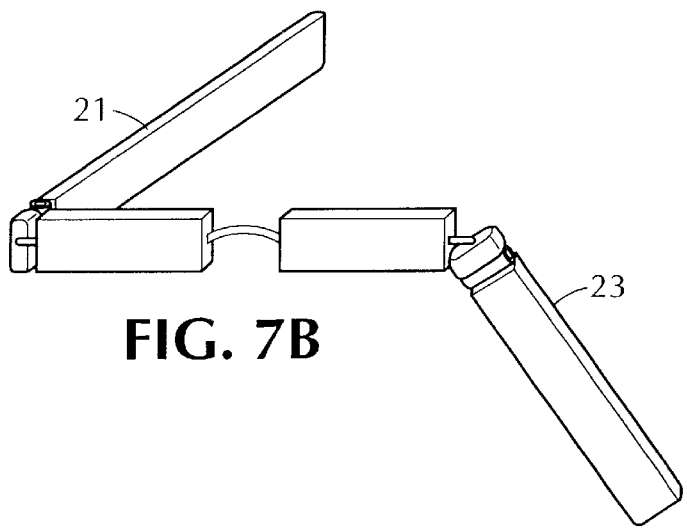
FIG. 7A
FIG. 7B
FIG. 7C
FIG. 7D
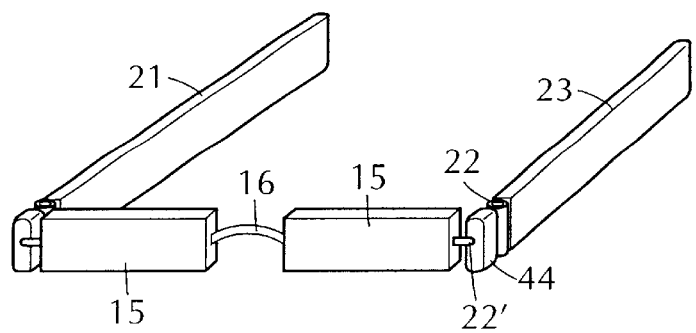
FIG. 8
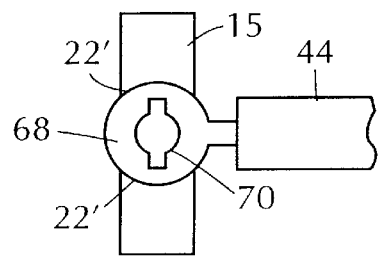
FIG. 8A
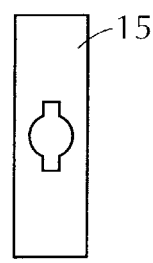
FIG. 8B
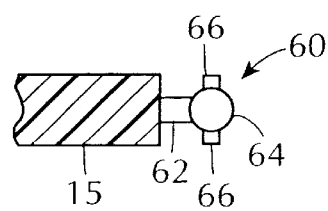

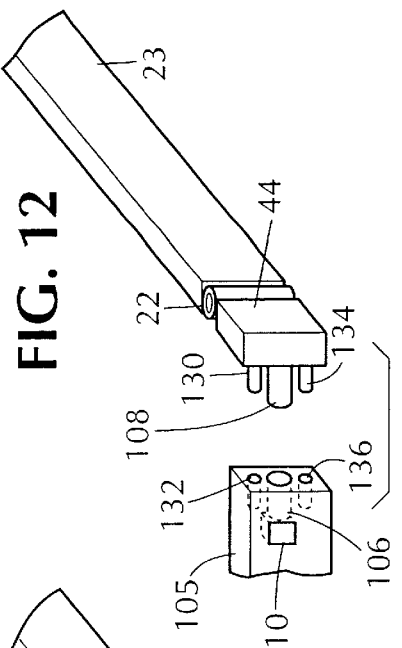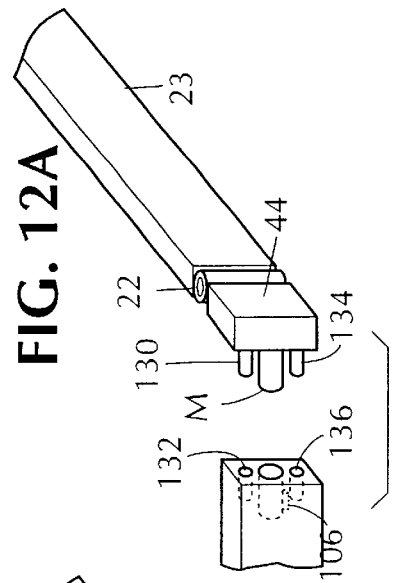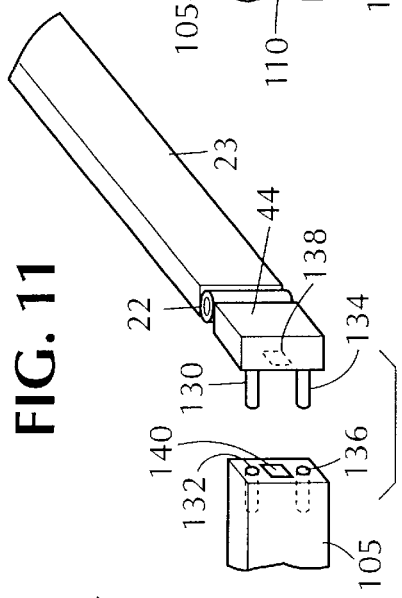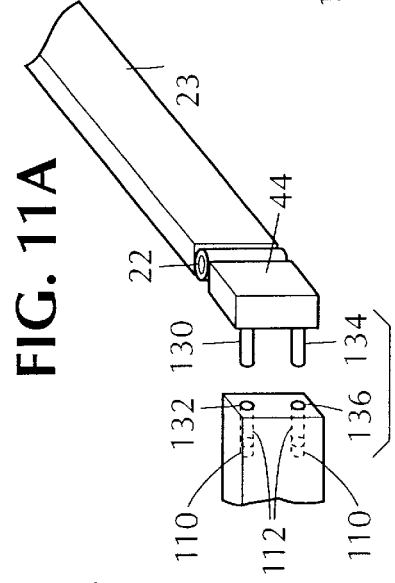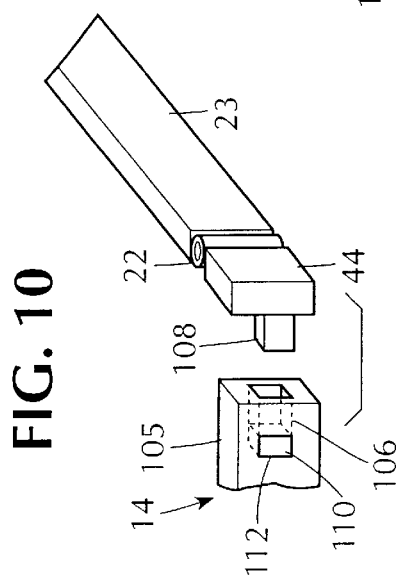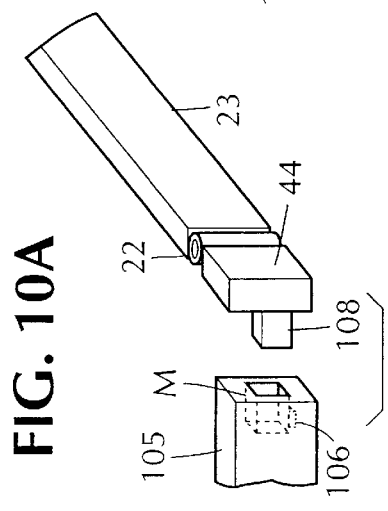

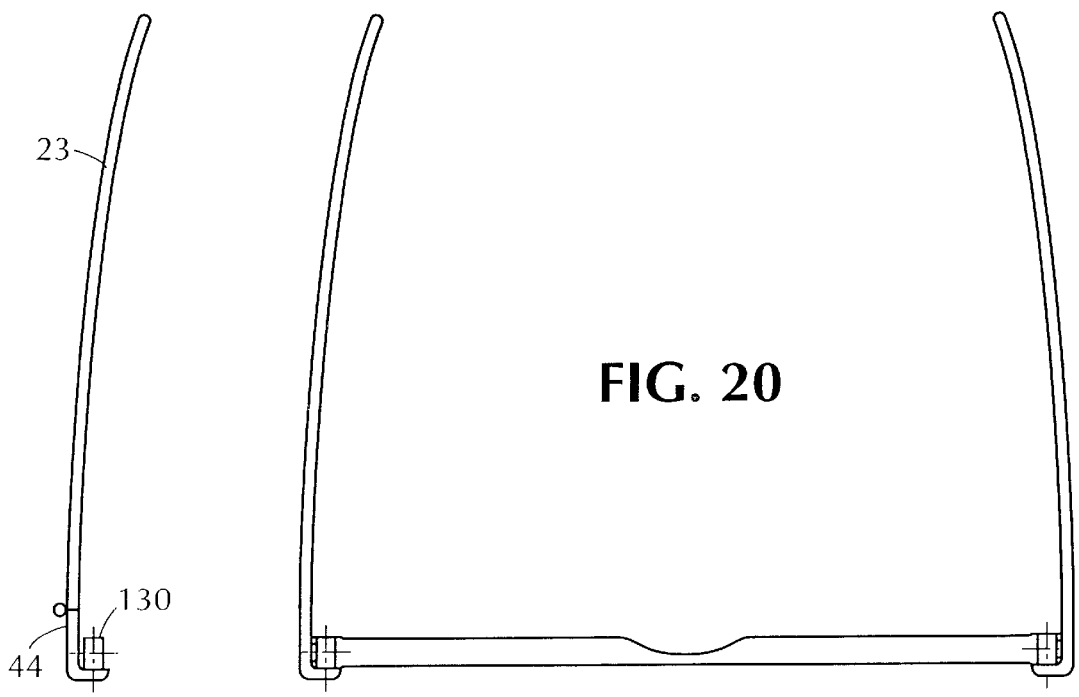
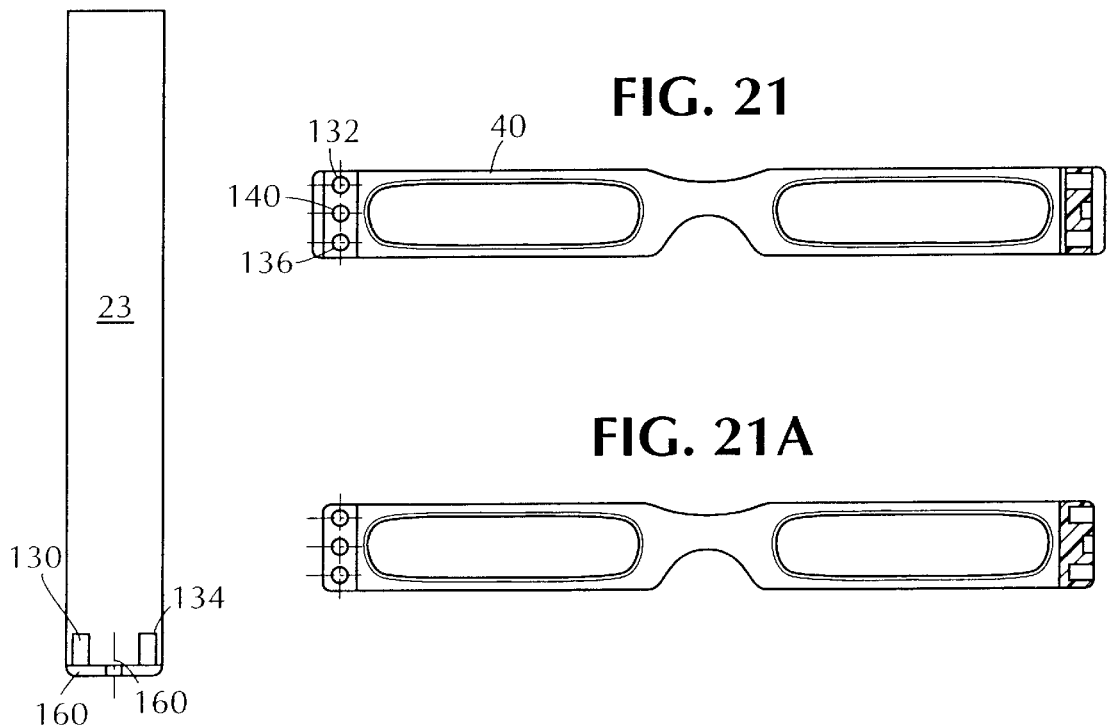

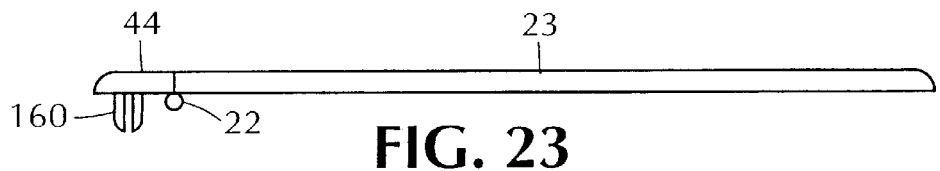
FIG. 23
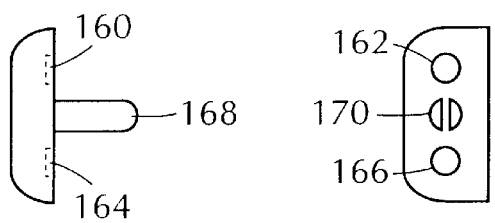
FIG. 22  FIG. 24
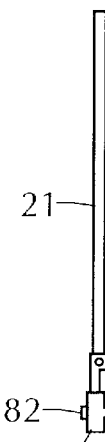
FIG. 25
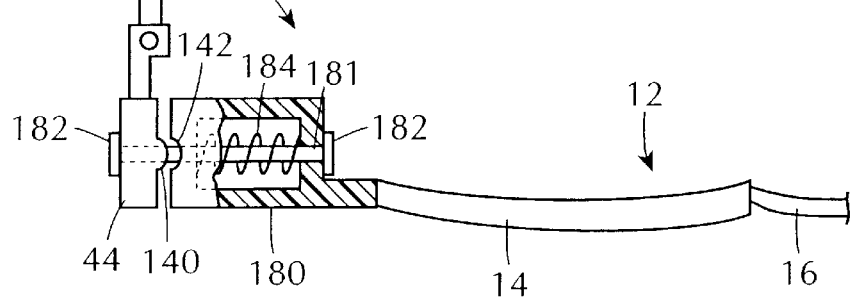
FIG. 26

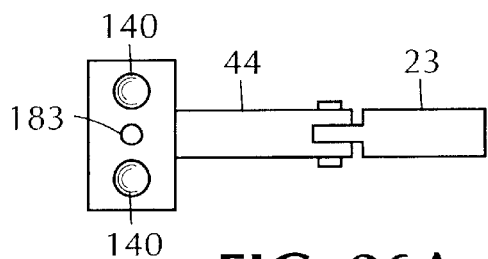
FIG. 26A
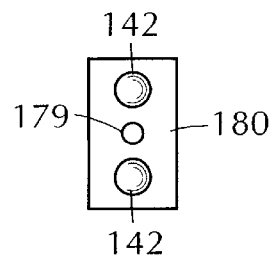
FIG. 26B
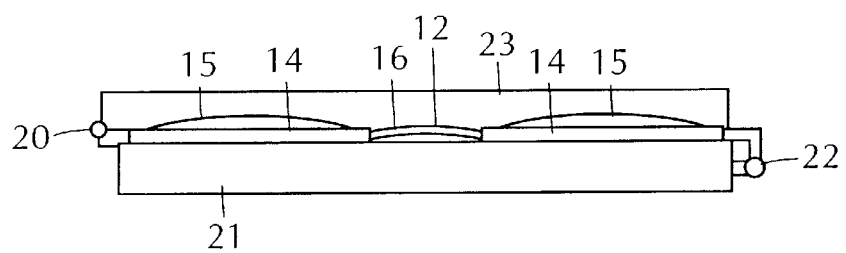
FIG. 27
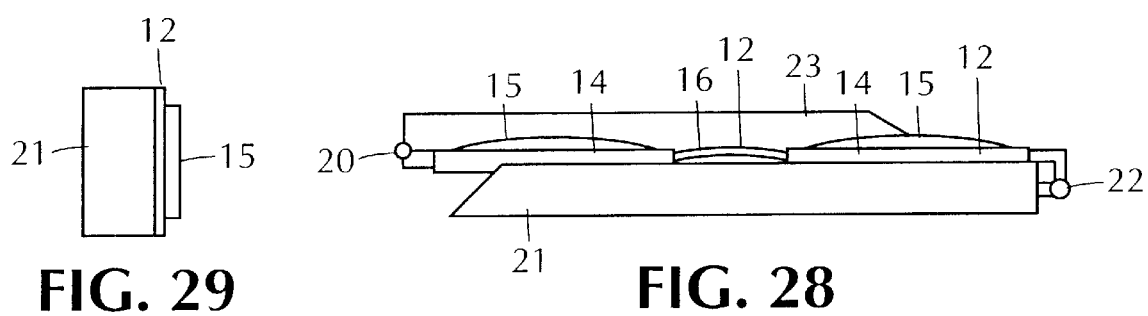
FIG. 29         FIG. 28
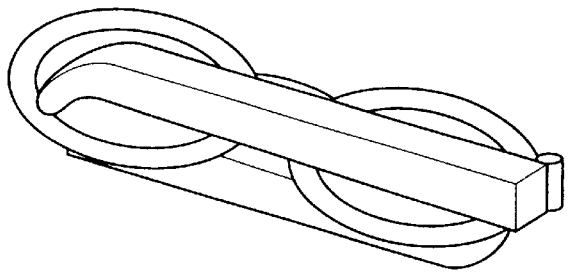
FIG. 30

EYEGLASS FRAME WITH A REVERSIBLE ARM

FIELD OF THE INVENTION

The present invention is directed to eyeglasses provided with at least one reversible arm that can be manipulated to fold in towards the outer (front) face of the lens retaining portion of the frame, thereby covering it. The arm can be attached to the frames in a variety of ways. For instance, the attachment can be mechanical, or magnetism may be employed in fixing the arm to the frame. Several structural arrangements are described that permit reversal of the arm from a position behind the lens retaining portion of the frame to a position in front thereof. The arm can then be folded to cover the front and back sides of the lenses.

BACKGROUND OF THE INVENTION

In the predominant, but hardly exclusive arrangement, eyeglasses are provided with a frame portion having a lens-retaining portion having sides that are joined by a hinge to the arms. The arms are positioned on the rear side of the frame portion, and move from an open position in which the arms can be positioned over the ears of the wearer, and a closed position in which the arms extend over the back side of lenses.

SUMMARY OF THE INVENTION

The present invention is directed to an eyeglass frame with a reversible arm. That is, at least one arm of the two arms is reversible from a position where it extends behind the lens retaining portion of the frame to a position where it extends in front thereof. This arrangement places the arm in front of the lens retaining portion. By positioning one arm in front of the lens retaining portion, and the other arm behind the lens retaining portion, each arm covers a side of the lens retaining portion of the frame when the arms are folded. That is, when the arm in front of the lens retaining portion is in the folded state, the arm covers the front side of the lens retaining portion. When the arm in back of the lens retaining portion is in the folded state, it covers the back side of the lens retaining portion. This provides a measure of protection for the lenses.

By "cover", the applicant means that the arms, when in the closed position, provide a total or partial blockage of lenses that are situated within the lens retaining portion. The blockage takes place on both the front and rear sides of the lens retaining portion. The blockage provides a measure of protection to the lenses, and should prevent the lenses from sustaining damage if they were to come in contact with any number of objects that could inflict such damage, such as keys, pens, coins, compacts, lip stick cases, etc., to cite an example of just some objects that could damage the lenses if the items are commingled in a backpack or in a pocketbook. A hard surface such as a table top may also inflict damage. Therefore, by "covering" the lenses, as meant by the term, and in accordance with the embodiments disclosed herein (and undisclosed variations thereon), the need for a glasses case may be obviated.

Also, it should be understood that with the applicant's invention, it is only necessary to cover the lenses. It is not necessary to encase the thickness dimension of the lenses or lens retaining portion, or to cover or encase the end portions of the lenses or lens retaining portion. In this arrangement, the lens retaining portion is not encased on all of its sides, that is, the thickness dimension of the lens retaining portion is not covered on all or a portion of the top side (adjacent the forehead), bottom side (adjacent the nose and cheeks), and end sides (the area where the arms are mounted). Thus, while more than the front and back sides may be covered, not all of the aforementioned sides are encased.

In covering the lenses, the arms of the eyeglasses may be provided with a height dimension that is equal to or less than the height dimension of the lenses, or equal to or less than a height dimension of the lens retaining portions. Also, the arms of the eyeglasses may be provided with a length dimension that is equal to or less than the length dimension of the lens retaining portion.

"Cover", as used herein, is shown throughout the drawings. FIGS. 1B, 1C, 1D, and 1E show total or partial blockage of the front and rear faces of the lens. They show that the lens retaining portion is not encased. The thickness dimension on the top, bottom and end sides is not encased. See also FIG. 7D where the top and bottom and end sides are not encased (but the lenses are totally blocked). See also FIG. 9D. FIG. 27 shows an embodiment where only a portion of the thickness dimension of the top side of the lens retaining portion and lenses is covered (and not encased). FIG. 28 shows another embodiment where a portion of the lens retaining portion is covered (and not encased). FIG. 29 shows an embodiment where a portion of an end side of the lens retaining portion is covered, and not encased. FIG. 30 is a perspective view of a pair of eyeglasses where the front face is partially blocked and a portion of the thickness dimension on the top side is also partially covered (and not encased). These Figures are not meant to be inclusive of all variations. They are merely exemplary of the meaning ascribed to "cover" in the present specification. Other variations, still within the scope of the definition, are possible.

Reversibility of one of the arms can be provided for in a variety of ways. Positioning of the reversing hinge in front of the lens retaining portion is one way to provide for reversibility. Another way is to align the reversing hinge off of the intersection of the axes of the arm and lens retaining portion. Yet another way is to provide a hinge that allows the arm to swing up and over (or down and under) the lens retaining portion. In yet another embodiment, the lens retaining portion is not employed and the hinges are mounted to the lenses and the arms or arm if assemblies.

In yet another embodiment, the arms are provided with hinges that twist in order reverse the direction in which the arms fold. When the arms and the lens retaining portion are provided with curved shapes, reversing the direction of the arms by twisting them at the hinges aligns the curved shapes so that the arms can fold into the lens retaining portion and cover the lenses.

Yet other embodiments employ magnetism to join the arm to the lens retaining portion. The arm and frame portion may be provided with magnetic material, that is, material that is susceptible to the influence of magnetism, or which is capable of exerting the influence of magnetism on another object. As used herein, "magnetic materials" include magnets and material that is susceptible to the influence of magnetism.

The invention may also employ a coupling or couplings of components that are provided on the arm portion and the frame portion. These components are engaged when the arm and front frame portion are joined together. The couplings may prevent the arm from rotating until the desired time to do so. The couplings may be a peg and socket pairing, or protrusion and recess in which the sidewall of the recess is gradually tapered. These arrangements provide resistance to the rotation of the arm at times when such rotation is not desired, such as when the user is wearing the glasses, or removes them temporarily, such as to clean them.

In one embodiment, a coupling of a magnetic material and a magnet is provided, with one being provided on the arm and the other being provided on the frame portion. In another embodiment, the coupling is a pair of magnets, one provided on the arm, the other provided on the frame portion. The poles of the magnets are arranged to attract each other.

In another embodiment, the magnetic material is arranged in a peg and socket pairing, with the magnetic material being used to construct at least a portion of the peg, and further being provided at a location in the socket, or in the vicinity of the socket to exert a magnetic force. For instance, the magnetic material can be placed at an end of the socket, in the walls that define the socket, or behind the walls that define the socket. The peg or socket may be the magnet, or merely a material subject to the force of magnetism, or the peg and socket may each be constructed in part of a magnet.

In yet another embodiment, the magnetic material is arranged as a protrusion and recess provided on the arm and the frame portion. The sidewalls of the recess and the sidewalls of the protrusion are tapered in order to allow for the displacement of the protrusion from the recess upon exertion of a sufficient force. A construction with this arrangement can permit the rotation of the arm from the backside portion of the frame portion to the front side of the frame portion.

In yet another embodiment, the magnetic material is arranged as a coupling of materials on the arm and the frame portion, each component of the flush materials being substantially flat, or flush.

In one embodiment, the arm has to be removed from the frame portion in order to effect the reversal in position from the back frame to the front frame. In yet another embodiment, the arm can be rotated without being detached in order to effect the reversal in position from the back frame to the front frame. In yet another embodiment, the interface where the protrusions, openings, magnetic members etc. are located is on the front face of the front frame portion. In yet another embodiment, the joinder regions are provided with a peg and socket arrangement that is located between a pair of substantially flush magnetic materials.

Variations on these embodiments are possible, the construction of such embodiments would be readily apparent to the skilled artisan from the teachings and suggestion of the present disclosure.

BRIEF DESCRIPTION OF THE DRAWINGS

FIG. 1 is a top plan view of an embodiment of the invention;

FIG. 1A is a perspective view from the backside of an embodiment of the present invention;

FIG. 1B is a perspective view from the backside of an embodiment of the present invention when the glasses are in a folded state;

FIG. 1C is a perspective view from the backside of another embodiment of the present invention when the glasses are in a folded state;

FIG. 1D is a perspective view from the frontside of an embodiment of the present invention when the glasses are in a folded state;

FIG. 1E is a perspective view from the frontside of another embodiment of the present invention when the glasses are in a folded state;

FIG. 2 is a perspective view of a hinge used in certain embodiments of the present invention;

FIG. 3 is a top plan view of an embodiment of the invention;

FIG. 3A is a top plan view of a hinge used in certain embodiments of the present invention;

FIG. 4 is a cross sectional view of a hinge used in certain embodiments of the present invention;

FIG. 5 is a top plan view of an embodiment of the invention;

FIG. 6 is an exploded view of an embodiment of the invention;

FIG. 6A is a perspective view of an embodiment of a hinge piece used in the present invention;

FIGS. 7A–7D are perspective views of an embodiment of the present invention, depicting the glasses as they progress from the unfolded wear state to the folded state with a reversed arm.

FIG. 8 is side elevational view of an embodiment of a hinge used in the present invention;

FIG. 8A is a side elevational of the glasses part of the hinge embodiment of FIG. 8;

FIG. 8B is a side elevational view of the glasses part of the hinge embodiment of FIG. 8.

FIG. 10 is an exploded view of an embodiment of the invention;

FIG. 10A demonstrates a variation on the embodiment depicted in FIG. 10;

FIG. 11 is an exploded view of another embodiment of the invention;

FIG. 11A demonstrates a variation on the embodiment depicted in FIG. 11;

FIG. 12 is an exploded view of another embodiment of the invention.

FIG. 12A demonstrates a variation on the embodiment depicted in FIG. 12;

FIG. 20 is a top plan view of another embodiment of the present invention.

FIG. 20A is a top plan view of an arm used in the embodiment of FIG. 20A.

FIG. 20B is a side elevational view of an arm used in the embodiment of FIG. 20A.

FIG. 21 is a side elevational view of the front of the eyeglasses of the embodiment of FIG. 20.

FIG. 21A is a side elevational view of the front of the eyeglasses of the embodiment of FIG. 20.

FIG. 22 shows a front elevational view of an embodiment of a joinder region of the present invention;

FIG. 23 shows a top plan view of the FIG. 22 embodiment of the present invention;

FIG. 24 shows a side elevational view of a joinder region of the present invention designed to engage with the region shown in FIG. 22;

FIGS. 25, 26, 26A and 26B show a further embodiment of the present invention.

FIG. 27 shows a top plan view of an embodiment of the present invention.

FIG. 28 shows a top plan view of an embodiment of the present invention.

FIG. 29 shows an end view of an embodiment of the present invention.

FIG. 30 shows a perspective view of an embodiment of the present invention.

DETAILED DESCRIPTION OF THE PREFERRED EMBODIMENT

Figure 9A:
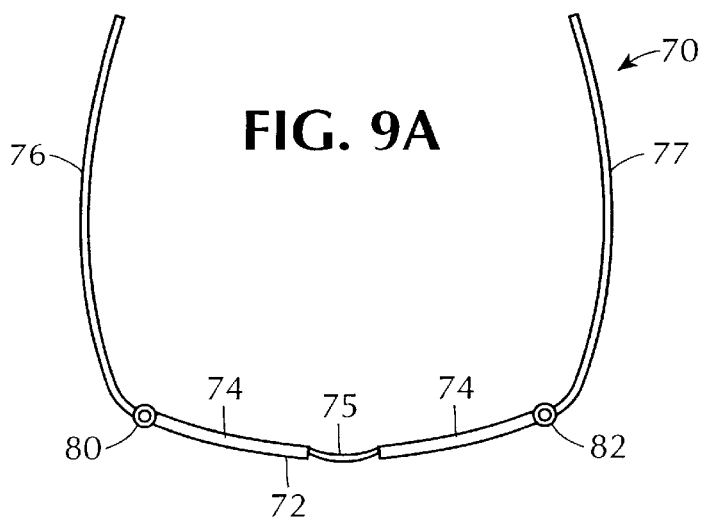
FIGS. 9A–9D are perspective views of an embodiment of the present invention, depicting the glasses as they progress from unfolded wear state to the folded state with a reversed arm.

FIG. 1 shows an embodiment of the present invention. The figure shows a pair of eyeglasses 10 provided with a lens retaining portion 12 having a lens retaining members 14 in which lenses 15 are retained. The lens retaining member 14 are joined by a bridge 16. Hinge 20 is positioned behind the lens retaining portion 12. This permits the arm 21 to swing in inward, as shown in phantom in FIG. 1, so that arm 21 extends over the back side of the lenses. As shown in FIG. 1B, the arm covers portion of the lenses 15. FIG. 1C shows an alternative embodiment in which the arm 21 covers the entirety of the lenses 15.

Returning to FIG. 1, hinge 22 is positioned in front of the lens retaining portion 12. This permits the arm 23 to swing outward. Arm 23 is shown in phantom, first swinging counterclockwise from the six o'clock position to the three o'clock position, and is then shown in phantom across the front side of the lens retaining portion 12. FIG. 1D shows an embodiment in which the arm 23 extends over the front side of the lens retaining portion 12 and thereby covers a portion of the lenses. FIG. 1E shows an embodiment in which arm 23 extends over the front side of the lens retaining portion and thereby covers the lenses on the front side.

Arms 21 and 23 are relatively long and wide in order to cover the lenses, when the glasses are in the folded state. However, as noted, the arms need not be as long and wide as the lenses (or lens retaining portion) for the reason that protection should be adequate from the coverage provided by the arms. In a preferred embodiment, the arms have a height dimension (i.e., the dimension corresponding to the bottom of the lenses to the top of the lenses) that is greater than the thickness dimension of the arms. Preferably, the thickness dimension of the arms does not vary at any location, in order to provide a measure of comfort when the eyeglasses are worn by the user.

To prevent arm 23 from swinging outward at inappropriate times, the hinge 22 can be provided with a stopper 25. As shown in FIG. 2, the stopper 25 is positioned inside the slot 26 of the front frame hinge component 27, at a position exterior to the hinge portion 28 of the arm 23 which is received in the slot 26. Thus, when arm 23 moves outward, it encounters the stopper 25 and is preventing from moving further, which would be undesirable at certain times, such as when the user is wearing the glasses.

The stopper can be made of any flexible material, such as elastomeric or thermoplastic materials. The stopper 25 is sized to permit the user to apply the necessary force to overcome the interference supplied by the stopper 25, in order to move the arm 23 outward into a folded position against the front side 205 of the front frame portion 204.

In another embodiment shown in FIG. 3, arm 21 rotates from a wear position to a position where it covers the back side of the lenses by moving counterclockwise from 6 o'clock to 3 o'clock, as the glasses are viewed from the top. Arm 23 rotates from a wear position to a position where it covers the front side of the lenses by moving counterclockwise from 6 o'clock to 9 o'clock, as the glasses are viewed from the top.

Hinge 30 is positioned off of the intersection of the axes of the arm 23 and the front frame portion 12. This can be achieved by providing a bend or curve in one of the components, such as providing a curve 29 in the arm 23 just before the hinge 30. Screw 31 joins the components. See FIG. 3A. The curve in the arm 23 is allows the arm to swing outward and rotate counterclockwise for 270°, so that the arm can cover the front of the lenses.

FIG. 4 shows a hinge arrangement in which the employs a cam and spring. Here hinge 30' is provided with a housing 35 located on the lens retaining portion 12, into which is positioned a spring 37 and ball bearing 38 in shaft portion 36 of housing 35. Lens retaining portion 12 is affixed to the housing 35 in any known manner, such as by joining the lens retaining portion to the housing by a screw.

The arrangements shown in U.S. Pat. Nos. 2,098,921, 3,064,530, 4,456,346, 4,832,479, 5,627,608, and 5,815,899 are also suitable for use in this invention and are incorporated herein by reference.

The arm 23 is provided with cam 40 having a recess 41 and a camming surface 42. When the arm 21 is in the closed position, the ball bearing 38 is positioned within the recess 41, and is maintained in that position by the force applied by the spring 37, which is biased toward closure, as this provides a mechanism for keeping the arms in the folded state, thereby protecting the front face of the lenses. This provides an inclination for the arm to stay in the closed position. In other words, the arm does not move outward. When the user wishes to move the arm into the open position, he or she merely rotates the arm outward. The camming surface 42 applies a countervailing force to the ball bearing 38, compressing the spring 37, permitting the arm 21 to rotate. It should be understood that the a second recess corresponding to the open position can be provided on the surface of the cam 40, or that the recess could be provided for only the position corresponding to the open position.

FIG. 5 shows yet another embodiment. Arm 21 rotates inward and covers the backside of the lenses. Arm 23 rotates upward or downward, that is, out of the page, to a position from behind the lens retaining portion 12 to a position in front of the lens retaining portion 12.

A hinge which can effect this embodiment is shown in FIG. 6, which shows the arm 23 provided with an extension 44 which joins the arm to the hinge 22, at which hinge 22 the arm rotates towards the lens retaining portion 14, or away from the lens retaining portion 14, as the case may be. Extension 44 is provided with a body 45 and a neck 46. Neck 46 resides within the slot 47 in hinge portion 48 that is fixed to the tubular extension 50 provided on lens retaining member 14. The tubular extension and hinge portion can be fixed together by a screw 52. Likewise, the extension 44 of the arm 23 can be joined to the hinge portion 48 by a screw 53. When the parts are assembled, the hinge portion, and hence the arm assembly, can be rotated 180° around the tubular extension 50. In other words, the arm assembly can rotate up and over the lens retaining portion 14, or down and under the lens retaining portion 14. In order to provide some resistance to unwanted rotation of the hinge portion about the tubular extension, the opening 54 and the tubular extension can be formed of an asymmetrical shape, such as an oval shape, to provide a tendency for the arm assembly to be in one of the two positions 180° apart from each other. See FIG. 6A.

FIGS. 7A–7D show a further embodiment in which rotation hinge 22' joins the arms 23 (or arm extensions 44) to the lenses 15. FIGS. 8A, 8B, and 8C show a rotating hinge arrangement 22' suited for use here, and in other embodiments as well. The lens portion has a pin 60 mounted to the lens 15. The pin has a neck 62 and a head 64. The head has compressible buttons 66 that can be retracted into the head. The arm 23 or arm extension 44 is provided with a nut 68 provided with an opening 70 that receives the head and buttons that are provided on the lens portion of the rotating hinge 22'. When the buttons 66 are compressed, such as by initiation of rotation of the arm 23 around the hinge, the arm 23 can move 180° around the hinge. As shown in FIGS. 7A and 7B, the arm 23 starts from behind the lenses, rotates downward through the paper, and then upward to a position in front of the lenses. When the arm 23 completes rotation, it can be closed at the closure hinge 22 by moving the arm inward towards the lenses, so that it covers the lenses. Arm 21 can be closed at the closure hinge 20 by rotating the arm 21 inwards towards the back side of the lenses, thereby covering them. In FIG. 7D, the arms 21 and 23 are shown as covering the entirety of the lenses. However, as in FIG. 1B, only a portion of the lenses may be covered.

FIGS. 9A, 9B, 9C, and 9D show a further embodiment. Eyeglasses 70 are shown in an open, ready to wear state in FIG. 9A. The glasses have a lens retaining portion 72 having lens retaining members 74 joined by bridge 75. At the outer ends of the lens retaining portion 72, arms 76 and 77 are attached thereto at hinges 80, 82. The arms may be joined to the hinges by any known means, such as by screws that pass though hoops attached to the front frame portion and the arms, such hoops being aligned with each other.

Figure 9B:
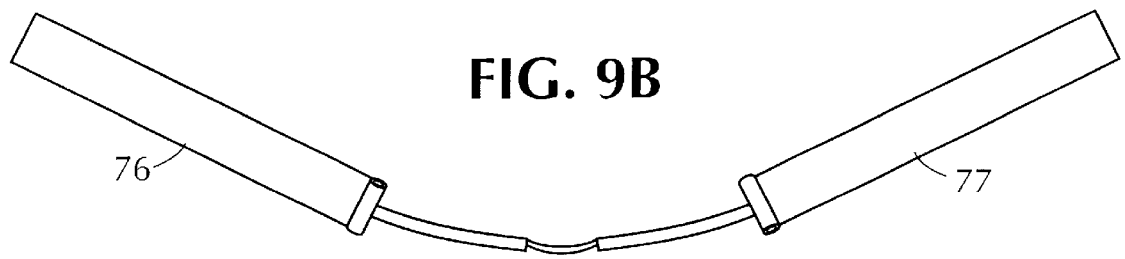
Figure 9C:
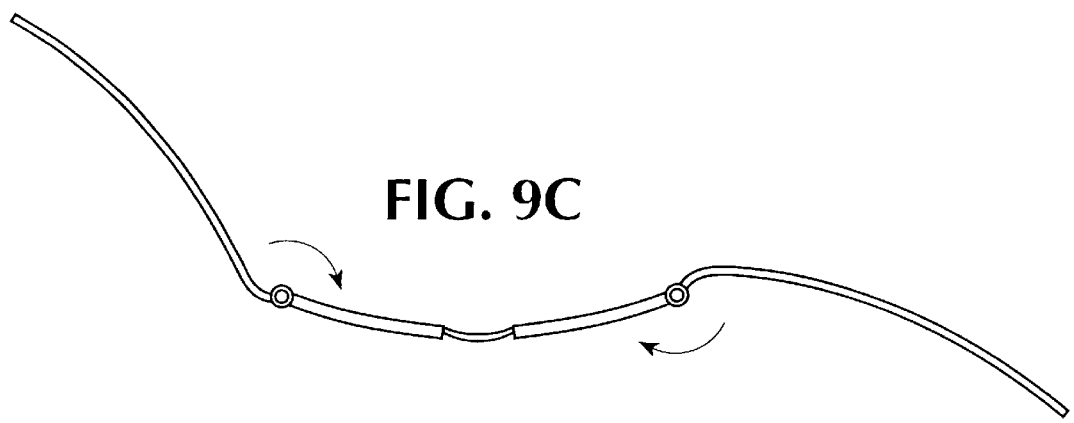
Figure 9D:
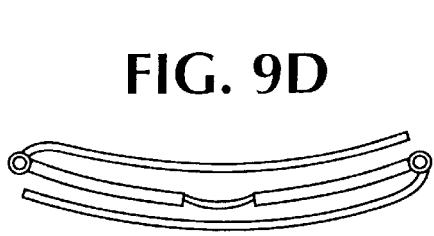

FIGS. 9B through 9D illustrate the closure of the glasses. In FIG. 9B the arms are rotated around their axes. FIG. 9B shows the arms after 90° of rotation, which exposes the relatively wider sidewalls of the arms. In FIG. 9C, the arms are rotated an additional 90° relative to FIG. 9B (i.e., 180° total rotation). The arms are then rotated around the axis of the hinge to a closed position. See FIGS. 9C, 9D. Each of the arms is rotated about the closure hinge in a clockwise position until they cover each side of the lens retaining portion.

In the embodiment shown in FIGS. 9A, 9B, 9C, and 9D, the front face portion and the arms have curved shapes. When the arms are rotated within the plane in which the arms extend, the curvature of the arms is complementary to the curvature of the front face portion on which each of the arms will reside, as shown in FIGS. 9C and 9D.

FIG. 10 illustrates an embodiment of the invention in which a leg 105 of the lens retaining member 14, which extends from one of the outer sides of the lens retaining member 14 (see FIG. 10), is provided with a socket 106 for receiving peg 108 provided on the arm extension 44 of the arm 23. The extension is attached to the arm by hinge 22, which permits the arm to fold from an open position to a closed position. Hinge 22 can be constructed of interengaging, vertically stacked hoops provided on the extension and on the arm portion. The hoops receive a screw or other securing member to maintain the extension and arm portion in engagement.

The peg 108 and the socket 106 include a magnetic material in their construction. As shown, magnetic material 110 is mounted at the end 112 of the socket 106. The peg 108 can be constructed in whole or in part of a magnetic material.

The FIG. 10 embodiment can be modified to provide an arrangement in which the magnetic material is placed in the walls that define the socket 106, or behind the walls that define the socket 106 See FIG. 10A.

In the arrangements of FIGS. 10 and 10A, the arm 23 and arm extension 44 (the arm assembly) can be separated from the lens retaining member 14 by pulling the arm assembly away from the lens retaining member 14 to overcome the magnetic attraction of the magnetic materials. The arm assembly can then be reversed, that is, moved from a position where it is behind the lens retaining member 14 (the wear position, in which the glasses can be worn) to a position where the arm is in front of the lens retaining member 14. The peg 108 can then be reinserted into the socket 106 and the arm 23 can be folded at the hinge 22, so that the arm covers the front side of the lenses. If arm 21 has a non reversible arrangement, then it can be folded at its hinge 20 to cover the back side of the lenses.

FIG. 11 illustrates an another embodiment in which a complimentary pair of peg and socket couplings, 130, 132 and 134, 136 are provided on the leg 105 and the arm extension 44 of the arm 23. In addition, a coupling of magnetic material 138, 140 is provided on the adjacent surfaces of the leg 105 and extension 44 of the arm 23. The coupling of magnetic material 138, 140 is substantially flush with the adjacent surfaces of the leg 105 and extension of the arm 23 in the joinder region.

In a variation on this arrangement, the peg and socket couplings can be constructed in whole or in part of a magnetic material, and the coupling of substantially flush magnetic material 138, 140 can be employed, or it can be omitted. For example, FIG. 11A shows an embodiment that does not include the coupling 138, 140, and a magnetic material 110 is mounted at the ends 112 of the sockets 132, 136. The pegs 130, 134 can be constructed in whole or in part of a magnetic material. Also, the magnetic material can be placed in the walls that define the sockets 132, 136, or behind the walls that define the sockets 132, 136.

In the arrangements of FIGS. 11 and 11A, the arm assembly can be separated from the lens retaining member 14 by pulling the arm away from the lens retaining member 14 to overcome the magnetic attraction of the magnetic materials. The arm 23 can then be reversed, that is, moved from a position where it is behind the lens retaining member 14 (the wear position in which the glasses can be worn) to a position where the arm is in front of the lens retaining member 14. The pegs 130, 132 can then be reinserted into the sockets 136, 140 and the arm 23 can be folded at the hinge 22. In the folded position the arm 23 covers the front side of the lenses. If arm 21 has a non reversible arrangement, then it can be folded at its hinge 20 to cover the back side of the lenses.

FIG. 12 illustrates an another embodiment in which a complimentary pair of peg and socket couplings, 130, 132 and 134, 136 are provided on the leg 105 and the arm 23 (or the extension of the arm 44). A third peg 108 and socket 106 coupling includes a magnetic material mounted 110 at the end 112 of the socket 106. Peg 108 can be constructed in whole or in part of a magnetic material.

The embodiment shown in FIG. 12 can be modified to provide an arrangement in which the magnetic material is placed in the walls that define the socket 106, or behind the walls that define the socket 106. Magnetic material can be mounted in the peg 108 or the placed in the walls of the socket 106, or behind the walls of the socket. See FIG. 12A.

In the arrangements of FIGS. 12 and 12A, the arm assembly can be separated from the lens retaining member 14 by pulling the arm assembly away from the lens retaining member 14 to overcome the magnetic attraction of the magnetic materials. The arm assembly can then be reversed, that is, moved from a position where it is behind the lens retaining member 14 (the wear position in which the glasses can be worn) to a position where the arm is in front of the lens. The pegs can then be reinserted into the sockets and the arm 23 can be folded at the hinge 22. The arm will cover front side of the front frame portion. If arm 21 has a non reversible arrangement, then it can be folded at its hinge 20 to cover the back side of the lenses.

Figure 13:
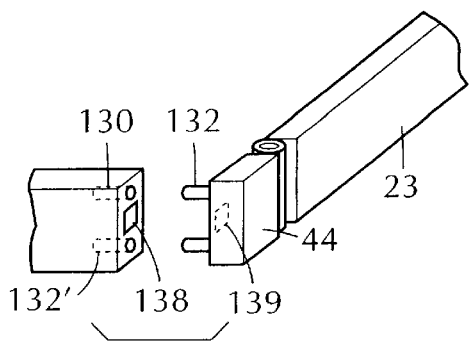
FIG. 13 is an exploded view of another embodiment of the invention.

FIG. 13 illustrates an another embodiment in which a peg and socket coupling, 130, 132 is provided on the leg 105 and the extension 44 of the arm 23. In addition, a coupling of magnetic material 138, 139 is provided on the adjacent surfaces of the leg 105 and extension 23 of the arm 44. The coupling of magnetic material 138, 139 is substantially flush with the adjacent surfaces of the leg 105 and extension 44 of the arm 23. A second socket 132' is provided. The arm assembly can then be reversed, that is, moved from a position where it is behind the lens retaining member 14 (the wear position in which the glasses can be worn) to a position where the arm is in front of the lens. The peg can then be reinserted into the socket 132' and the arm 23 can be folded at the hinge 22. The arm will cover front side of the front frame portion. If arm 21 has a non reversible arrangement, then it can be folded at its hinge 20 to cover the back side of the lenses.

Figure 14:
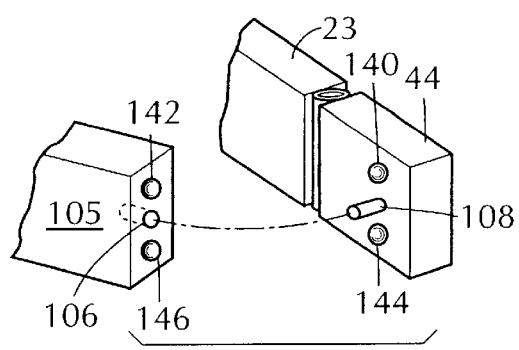
FIG. 14 is an exploded view of another embodiment of the invention.
Figure 15:
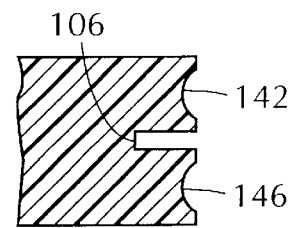
FIG. 15 is a cross sectional view of a component shown in the embodiment depicted in FIG. 14.

FIGS. 14 and 15 illustrate yet another embodiment of the present invention in which couplings of protrusions and dimples 140, 142 and 144, 146 are provided. The sidewalls of the dimples 140, 142 and the sidewalls of the protrusions 144, 146 are curved surfaces, with the protrusions having a convex surface profile and the dimples having a concave surface profile. When the arm assembly is mounted to the lens retaining member 14 the protrusions will reside in the dimples. The arm can be rotated around the peg 108, which resides in the socket 106 as previously described. This arrangement allows for the displacement of the protrusions from the recess upon exertion of a sufficient force. A construction with this arrangement can permit the rotation of the arm assembly from the back side of the lens retaining member 14 to the front side of the lens retaining member 14, without removal of the arm from the lens retaining member 14. The magnetic material can be provided in the coupling of the protrusions and dimples 140, 142 and 144, 146, or in the coupling(s) of the peg and socket 108, 106, or in both. Likewise the magnetic material can be provided in or mounted on any one of couplings, i.e., protrusions and dimples, peg and socket, in the manners previously described.

In the arrangements of FIGS. 14 and 15, the arm assembly can be rotated relative to the lens retaining member 14 by exerting a rotational force on the arm in order to displace the protrusions from the dimples. The arm 23 can then be reversed, that is, moved from a position where it is behind the lens retaining member 14 (the wear position in which the glasses can be worn) to a position where the arm is in front of the lens retaining member 14. In this arrangement, the arm rotates around the peg and socket. Once the arm has rotated substantially 180°, the protrusions will enter the dimples, stabilizing the arm against further undesired rotational movement. When the arm 23 is folded it will cover the front side of the lenses. If arm 21 has a non reversible arrangement, then it can be folded at its hinge 20 to cover the back side of the lenses.

Figure 16:
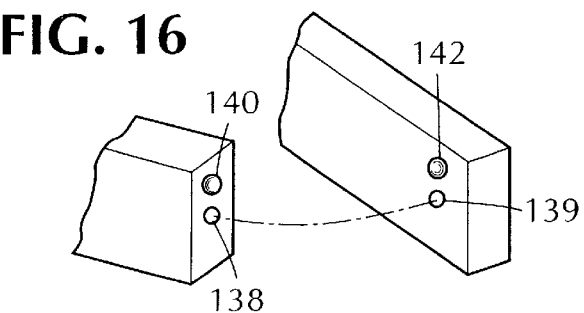
FIG. 16 is an exploded view of another embodiment of the invention.
Figure 17:
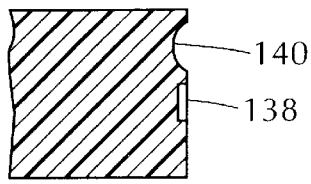
FIG. 17 is a cross sectional view of a component shown in the embodiment depicted in FIG. 16.

FIGS. 16 and 17 illustrate a further embodiment in which a coupling of a protrusion and dimple 140, 142 is provided on the leg 105 and the arm 23 (or the extension 44 of the arm 23). An additional dimple is provided to receive the protrusion after it has been rotated. In addition, a coupling of magnetic material 138, 139 is provided on the adjacent surfaces of the leg 105 and extension 44 of the arm 23. The coupling of magnetic material 138, 139 is substantially flush with the adjacent surfaces of the leg 105 and extension 44 of the arm 23.

In the arrangements of FIGS. 16 and 17, the arm 23 can be rotated relative to the lens retaining member 14 by exerting a rotational force on the arm 23 in order to displace the so protrusion 142 from the dimple 140. The arm 23 can then be reversed, that is, moved from a position where it is behind the lens retaining member 14 (the wear position in which the glasses can be worn) to a position where the arm is in front of the lens retaining member 14. In this arrangement, the arm 23 rotates around the peg and socket. Once the arm 23 has rotated substantially 180°, the protrusion 142 will enter the dimple 140, stabilizing the arm 23 against further undesired rotational movement. When the arm 23 is folded it will cover the front side of the lenses. If arm 21 has a non reversible arrangement, then it can be folded at its hinge 20 to cover the back side of the lenses.

Figure 18:
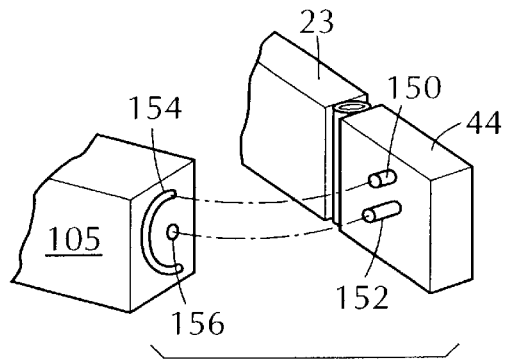
FIG. 18 is an exploded view of another embodiment of the invention.
Figure 19:
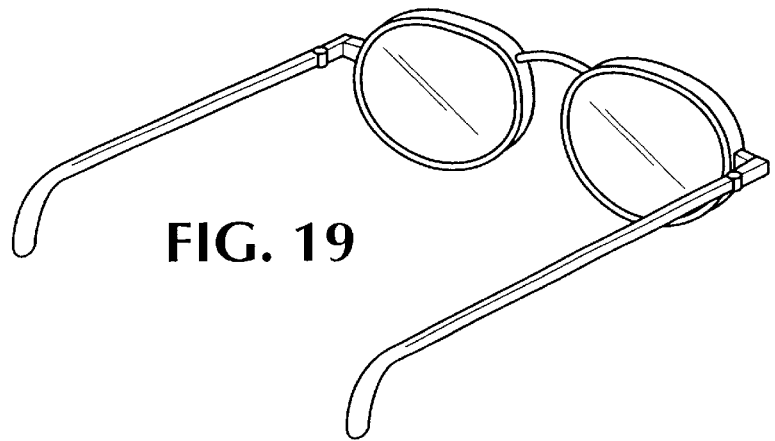
FIG. 19 is a perspective view of a pair of eyeglasses.

FIG. 18 illustrates a further embodiment in which the pegs 150, 152 are respectively coupled to groove 154 and socket 156, respectively. The groove 154 is a recessed portion having an arcuate shape that provides a track for peg 150 to traverse. Since peg 150 can travel along groove 154 when the arm assembly is subjected to a rotational force, the arm assembly can be rotated from a position behind the lens retaining member 14 to a position in front of the lens retaining member 14.

In the arrangement of FIG. 18, the arm assembly can be rotated relative to the lens retaining member 14 by exerting a rotational force on the arm in order to move the peg through the groove. The arm can then be reversed, that is, moved from a position where it is behind the lens retaining member 14 (the wear position in which the glasses can be worn) to a position where the arm is in front of the lens retaining member 14. In this arrangement, the arm rotates around the pegs and sockets. When the arm 23 is folded it will cover the front side of the lenses. If arm 21 has a non reversible arrangement, then it can be folded at its hinge 20 to cover the back side of the lenses.

FIGS. 20, 20A, 20B, 21 and 21A illustrate another embodiment in which a complimentary pair of peg and socket couplings, 130, 132 and 134, 136 are provided on the lens retaining member 14 and the extension 44 of the arm 23. In addition, a coupling of magnetic material 138, 140 is provided on the adjacent surfaces of the leg 105 and extension of the arm. The coupling of magnetic material 138, 140 is substantially flush with the adjacent surfaces of the leg 105 and extension of the arm 23 in the joinder region. In this embodiment, at least one of the two interfaces between the extension and the front frame portion occurs on the front face of the front frame portion. An additional perpendicular attachment 160 is provided on one of the extensions. The perpendicular attachment 160 is substantially at a right angle to the other component of the extension, at least when the eyeglasses are in a wearable arrangement. As shown on the left side of FIG. 21, the interface between the extension and the front frame portion occurs on the front face of the front frame portion. The sockets 132, 136 extend on both sides of the lens retaining portion. Thus, the arm can be removed from the front side of the lens retaining portion, reversed, and then plugged back in to the rear side of the lens retaining portion, thereby reversing the direction of the arm.

FIGS. 22–24 show yet a further embodiment of the present invention in which a pair of substantially flush couplings of magnetic material 160, 162 and 164, 166 are provided in the joinder region on the leg 105 and the extension 23 of the arm 44. In addition, a coupling of a peg and socket 168, 170 is located in the joinder region on the leg 15 and the arm, preferably between the pair of substantially flush couplings of magnetic material 160, 162 and 164, 166. As shown in these Figures, the peg 168 may be a spring clip which is biased radially outwards so that the peg forms an interference fit with the inner walls of the socket 170, which helps maintain the spring in place.

In the arrangement of FIGS. 22–24, the arm assembly can be rotated around the peg 168 as it resides in the socket 170. Rotating the arm assembly in this manner overcomes the magnetic attraction of the magnetic materials and reverses the position of the arm in which it is moved from a position where it is behind the lens retaining member 14 (the wear position in which the glasses can be worn) to a position where the arm is in front of the lens retaining member 14. When the arm 23 is folded it will cover the front side of the lenses. If arm 21 has a non reversible arrangement, then it can be folded at its hinge 20 to cover the back side of the lenses. By pulling the arm away from the front frame portion to overcome the magnetic attraction of the magnetic materials. The arm can then be reversed, that is, moved from a position where it is behind the front frame portion (the position in which the glasses can be worn) to a position where the arm is in front of the lens.

If desired, the peg and socket 168, 170 can be constructed of magnetic materials in the manner previously described.

FIGS. 25, 26, 26A, and 26B show yet a further embodiment of the invention in which the sides of the lens retaining portion 12 is provided with a housing 180 having an opening 179 therethrough, in which opening the pin 181 passes. The pin also passes through the arm extension 44 which also is provided with an opening 183 through which the pin passes. A spring 184 is positioned around the longitudinal axis of the pin and is biased against the walls on the inside of the housing. A knob or nut or like device 183 can be used to secure the pin in place and tighten it as well. The arm extension 44 is provided with a pair protrusions 142 located on either side of the opening 183. The housing 180 is provided with recesses located on either side of the opening 179 and positioned to receive the protrusions 142. When the nut is tightened the spring is tensioned against the inner walls of the housing, creating a force that maintains the protrusions within the recess.

Rotating the arm assembly overcomes the force that maintains protrusions within the recess. The arm can be moved from a position where it is behind the lens retaining member 14 (the wear position in which the glasses can be worn) to a position where the arm is in front of the lens retaining member 14, when the arm has moved 180° the protrusions move back into the recess. When the arm 23 is folded it will cover the front side of the lenses.

In the present invention, the bridge is of a non-folding construction. For example, the bridge is not provided with a hinge located on the midportion of its structure, which would permit the bridge itself to fold.

It is preferable that one of the arms of the present invention be non-rotatable from behind the lens retaining member to a position in front of the lens retaining member. In other words, in these embodiments, only one arm should be provided with an arrangement that permits it to rotate.

It should be understood that the terms "arm" and "arm extension" are used interchangeably herein.

While embodiments of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

We claim:

1. A pair of eyeglasses having arms that cover the front side and the rear side of the lenses, comprised of:
    an eyeglass frame having a lens retaining portion retaining a pair of lenses, a first arm and a second arm attached to the front frame portion by hinges that allow the first and second arms to be moved into a wear state, wherein the first arm is further movable into a position in which it covers the front face of the lenses, and the second arm is movable into a position in which it covers the rear face of the lenses;
    wherein, in a compact state, the first arm covers the front face of the lenses, and the second arm covers the rear face of the lenses.

2. The pair of eyeglasses of claim 1 wherein the first arm is reversible from a position behind the lens retaining portion to a position in front of the lens retaining portion.

3. The pair of eyeglasses of claim 1 where in the first arm is reversible from a position in which the arm moves inward towards the lens retaining member to a position where the arm initially moves outward away from the lens retaining member and then towards the lens retaining member.

4. The pair of eyeglasses of claim 3 wherein the hinge of the first arm is open on an outer side of the hinge to allow the first arm to move initially outward.

5. The pair of eyeglasses of claim 3 wherein the first arm moves 270°.

6. The pair of eyeglasses of claim 1 wherein a portion of the front and rear sides of the lenses are covered by the respective arms.

7. The pair of eyeglasses of claim 1 wherein the length dimension of the respective arms are less than the length dimension of the lens retaining member.

8. The pair of eyeglasses of claim 1 wherein the height dimension of the respective arms is less than the height dimension of the lenses.

9. The pair of eyeglasses of claim 1 wherein the totality of the front and rear sides of the lenses are covered.

10. The pair of eyeglasses of claim 1 wherein the hinge of the first arm is positioned in front of the lens retaining portion.

11. The pair of eyeglasses of claim 1 wherein hinge of the first arm is further comprised of a stopper positioned to inhibit outward movement of the first arm.

12. The pair of eyeglasses of claim 11 wherein hinge of the first arm is further comprised of a stopper positioned to inhibit outward movement of the first arm.

13. The pair of eyeglasses of claim 1 wherein the hinge of the first arm is positioned off of the intersection between the axis of the first arm and the axis of the lens retaining portion.

14. The pair of eyeglasses of claim 1 wherein the hinge is further comprised of a hinge having a cam assembly including of a housing attached to the lens retaining member, the housing receiving a cam positioned at the end of the first arm, the cam having a cam surface and a recess for receiving a ball bearing that is biased into the recess by biasing means.

15. The pair of eyeglasses of claim 14 wherein the biasing means is a spring.

16. The pair of eyeglasses of claim 1 wherein the hinge of the first arm allows the arm to move over or under the lens retaining portion.

17. The pair of eyeglasses of claim 16 wherein the first arm is comprised of a second in which the arm rotates under or over the lens retaining member.

18. The pair of eyeglasses of claim 17 wherein the second hinge includes a pivoting surface to which a pivoting arm is attached, wherein the first arm is mounted to the second hinge.

19. The pair of eyeglasses of claim 1 wherein the hinge of the first arm moves 180° over or under the lens retaining member.

20. The pair of eyeglasses of claim 1 wherein the lens retaining portion is provided with legs that extend from the outer side of the lens retaining members, the legs being joined to the arms of the eyeglasses, wherein an arm and a leg are provided with a coupling of a peg and a socket for receiving the peg, and wherein the peg and the socket include a magnetic material in their construction.

21. The eyeglass frame of claim 20 wherein the magnetic material is mounted at the end of the socket.

22. The eyeglass frame of claim 20 wherein the magnetic material is mounted in the walls of the socket.

23. The eyeglass frame of claim 20 wherein the magnetic material is mounted behind the walls of the socket.

24. The eyeglass frame of claim 20 wherein the peg can be constructed in whole or in part of a magnetic material.

25. The eyeglass frame of claim 20 wherein an extension of the arm and the leg are provided with a coupling of a peg and a socket for receiving the peg.

26. The eyeglass frame of claim 25 wherein the extension of the arm is attached to the arm by hinge.

27. The pair of eyeglasses of claim 20 wherein the lens retaining portion is provided with legs that extend from an outer side of the lens retaining members, the legs being joined to arms of the eyeglasses, wherein an arm and a leg are provided with a coupling of a peg and a socket for receiving the peg, the coupling being joined in a joinder region, wherein a further coupling of a peg and arcuate groove is provided in the joinder region.

28. The pair of eyeglasses of claim 1 wherein the lens retaining portion is provided with legs that extend from an outer side of the lens retaining members, the legs being joined to arms of the eyeglasses, wherein an arm and a leg are provided with a pair of couplings of a peg and a socket for receiving the pegs, the couplings being joined in a joinder region, and wherein a coupling of a magnetic material having an arm component and a leg component is provided in the joinder region.

29. The eyeglass frame of claim 28 wherein the coupling of magnetic material is provided by a magnetic material positioned on a surface of the arm and the leg in the joinder region, wherein the magnetic material is substantially flush with the arm and the leg.

30. The eyeglass frame of claim 28 wherein the coupling of magnetic material is provided in a coupling of a peg and socket.

31. The eyeglass frame of claim 30 wherein the coupling of magnetic material is provided in a coupling of a peg and socket.

32. The eyeglass frame of claim 30 wherein the magnetic material is mounted at the end of the socket.

33. The eyeglass frame of claim 30 wherein the magnetic material is mounted in the walls of the socket.

34. The eyeglass frame of claim 30 wherein the magnetic material is mounted behind the walls of the socket.

35. The eyeglass frame of claim 30 wherein the peg can be constructed in whole or in part of a magnetic material.

36. The eyeglass frame of claim 30 wherein the coupling of a magnetic material is an additional coupling of a peg and socket located between the pair of couplings of the peg and socket.

37. The eyeglass frame of claim 36 wherein the magnetic material is mounted at the end of the socket.

38. The eyeglass frame of claim 36 wherein the magnetic material is mounted in the walls of the socket.

39. The eyeglass frame of claim 36 wherein the magnetic material is mounted behind the walls of the socket.

40. The eyeglass frame of claim 36 wherein the peg can be constructed in whole or in part of a magnetic material.

41. The pair of eyeglasses of claim 1 wherein the lens retaining portion is provided with legs that extend from an outer side of the lens retaining members, the legs being joined to arms of the eyeglasses, wherein an arm and a leg are provided with a coupling of a peg and a socket for receiving the peg, the coupling being joined in a joinder region, and wherein a coupling of a magnetic material having an arm component and a leg component is provided in the joinder region.

42. The eyeglass frame of claim 41 wherein the coupling of magnetic material is provided by a magnetic material positioned on a surface in the joinder region, wherein the magnetic material is substantially flush with the arm and the leg.

43. The eyeglass frame of claim 41 wherein the coupling of magnetic material is provided in a coupling of a peg and socket.

44. The eyeglass frame of claim 41 wherein the magnetic material is mounted at the end of the socket.

45. The eyeglass frame of claim 41 wherein the magnetic material is mounted in the walls of the socket.

46. The eyeglass frame of claim 41 wherein the magnetic material is mounted behind the walls of the socket.

47. The eyeglass frame of claim 41 wherein the peg can be constructed in whole or in part of a magnetic material.

48. The pair of eyeglasses of claim 1 wherein the lens retaining portion is provided with legs that extend from an outer side of the lens retaining members, the legs being joined to arms of the eyeglasses, wherein an arm and a leg are provided with a first coupling of a protrusion and dimple wherein the protrusion has a convex surface profile and the dimple has a concave surface profile, and wherein the arm and leg are further provided with a second coupling of a peg and socket, wherein one of the first coupling or the second coupling includes a magnetic material on the arm and the leg.

49. The eyeglass frame of claim 48 wherein the magnetic material is included in the coupling of the protrusion and dimple located on the arm and the leg.

50. The eyeglass frame of claim 48 wherein the magnetic material is included in the coupling of the peg and socket located on the arm and the leg.

51. The eyeglass frame of claim 48 wherein the magnetic material is mounted at the end of the socket.

52. The eyeglass frame of claim 48 wherein the magnetic material is mounted in the walls of the socket.

53. The eyeglass frame of claim 48 wherein the magnetic material is mounted behind the walls of the socket.

54. The eyeglass frame of claim 48 wherein the peg can be constructed in whole or in part of a magnetic material.

55. The eyeglass frame of claim 48 wherein the first coupling is comprised of a pair of protrusions and dimples wherein the protrusions have a convex surface profile and the dimples have a concave surface profile.

56. The eyeglass frame of claim 1 wherein the eyeglass frame is provided with a magnetic attachment including a lens retaining portion provided with legs that extend from an outer side of the lens retaining members, the legs being joined to arms of the eyeglasses, wherein an arm and a leg are provided with first and second couplings of magnetic material and wherein the arm and leg are further provided with a second coupling of a peg and socket situated between the first and second couplings.

57. The eyeglass frame of claim 56 wherein the magnetic material is included in the coupling of the protrusion and dimple located on the arm and the leg.

58. The eyeglass frame of claim 56 wherein the magnetic material is included in the coupling of the peg and socket located on the arm and the leg.

59. The eyeglass frame of claim 58 wherein the magnetic material is mounted at the end of the socket.

60. The eyeglass frame of claim 58 wherein the magnetic material is mounted in the walls of the socket.

61. The eyeglass frame of claim 58 wherein the magnetic material is mounted behind the walls of the socket.

62. The eyeglass frame of claim 58 wherein the peg can be constructed in whole or in part of a magnetic material.

63. The pair of eyeglasses of claim 1 wherein the lens retaining portion and the arms are provided with a pair of couplings of a peg and a socket for receiving the pegs, the couplings being joined in a joinder region, and wherein a coupling of a magnetic material having an arm component and a leg component is provided in the joinder region, wherein the joinder region is located on the front face of the lens.

64. The eyeglass frame of claim 63 wherein at least one of the legs is provided with a perpendicular extension that houses the joinder region components for the arm.

65. The eyeglasses of claim 1 wherein the arm is provided with protrusions that are received within complementary dimples located on a housing on the lens retaining portion, whereby the arm and the housing are provided with through holes through which a joining pin passes, and wherein the housing has an inner cavity in which a biasing spring is housed.

66. The eyeglasses of claim 65 wherein the pin is provided with a tightening nut for securing the joining pin within the through holes.

67. A pair of eyeglasses a having arms that cover the front side and the rear side of the lenses, comprised of:
a pair of lenses joined together by a bridge, a first arm and a second arm attached to the lenses by hinges that allow the first and second arms to be moved into a wear state, wherein the first arm is further movable into a position in which it covers the front face of the lenses, and the second arm is movable into a position in which it covers the rear face of the lenses;

wherein, in a compact state, the first arm covers the front face of the lenses, and the second arm covers the rear face of the lenses.

68. The pair of eyeglasses of claim 67 in which the hinge is comprised of a pin mounted to the lens and a head attached to the pin, wherein the head has compressible buttons that can be retracted into the head, and the arm is provided with a nut provided with an opening that receives the head and buttons.

69. A pair of curved eyeglasses having arms that cover the front side and the rear side of the lenses, comprised of:
a curved lens retaining portion having lens retaining members;
curved arms mounted on the lens retaining portion at hinges, wherein the one of the arms rotates around the axis of the hinge in a direction towards a back side of the lens retaining portion and the other arm rotates around the axis of the hinge towards a front side of the lens retaining portion, the arms further rotating around the axis formed by the length direction in which the arms extend.

70. The eyeglasses of claim 68 having an arcuate shape in a closed state, wherein the arms and lens retaining are in a nested relationship.

71. A pair of eyeglasses having arms that cover the front side and the rear side of the lenses, comprised of:
an eyeglass frame having a lens retaining portion having a non-folding bridge that retains a pair of lenses, a first arm and a second arm attached to the front frame portion by hinges that allow the first and second arms to be moved into a wear state, wherein the first arm is further movable into a position in which it covers the front face of the lenses, and the second arm is movable into a position in which it covers the rear face of the lenses;
wherein, in a compact state, the first arm covers the front face of the lenses, and the second arm covers the rear face of the lenses.

72. A pair of eyeglasses having arms that cover the front side and the rear side of the lenses, comprised of:
an eyeglass frame having a lens retaining portion retaining a pair of lenses, a first arm and a second arm attached to the front frame portion by hinges that allow the first and second arms to be moved into a wear state, wherein the first arm is further movable from a position in which it is located behind the lens retaining portion to a position in which it is in front of the lens retaining portion, and wherein the first arm is further movable to a position in which it covers the front face of the lenses, and the second arm is movable into a position located behind the front frame portion to a position in which it covers the rear face of the lenses;
wherein, in a compact state, the first arm covers the front face of the lenses, and the second arm covers the rear face of the lenses.

73. The pair of eyeglasses of claim 72 wherein the second arm is fixed at a position behind the lens retaining portion.

74. The pair of eyeglasses of claim 73 wherein the first and second arms are not foldable.

75. The pair of eyeglasses of claim 74 wherein the lens retaining portion has a non-folding bridge that retains a pair of lenses.

76. The pair of eyeglasses of claim 72 wherein the lens retaining portion has a non-folding bridge that retains a pair of lenses.

77. The pair of eyeglasses of claim 72 wherein the first and second arms are not foldable.

78. The pair of eyeglasses of claim 77 wherein the lens retaining portion has a non-folding bridge that retains a pair of lenses.

79. A pair of eyeglasses having arms that cover the front side and the rear side of the lenses, comprised of:
- an eyeglass frame having a lens retaining portion retaining a pair of lenses, a first arm and a second arm attached to the front frame portion by hinges that allow the first and second arms to be moved into a wear state, wherein at least the first arm is provided with means for repositioning the arm from a position in which it is located behind the lens retaining portion to a position in which it is in front of the lens retaining portion, and wherein at least the first arm is further movable to a position in which it covers the front face of the lenses, and the second arm is movable into a position located behind the front frame portion to a position in which it covers the rear face of the lenses;
- wherein, in a compact state, the first arm covers the front face of the lenses, and the second arm covers the rear face of the lenses.

80. The pair of eyeglasses of claim 79 wherein the means for moving the arm from a position in which it is located behind the lens retaining portion to a position in which it is in front of the lens retaining portion is further comprised of a means for fixing the arms into a first position and a second position, wherein the first position is located in front of the lens retaining portion and the second position is located behind the lens retaining portion.

81. The pair of eyeglasses of claim 80 wherein the first position and the second position are about 180° apart.

82. The pair of eyeglasses of claim 79 wherein the second arm is fixed at a position behind the lens retaining portion.

83. The pair of eyeglasses of claim 82 wherein the first and second arms are not foldable.

84. The pair of eyeglasses of claim 83 wherein the lens retaining portion has a non-folding bridge that retains a pair of lenses.

85. The pair of eyeglasses of claim 79 wherein the lens retaining portion has a non-folding bridge that retains a pair of lenses.

86. The pair of eyeglasses of claim 79 wherein the first and second arms are not foldable.

87. The pair of eyeglasses of claim 86 wherein the lens retaining portion has a non-folding bridge that retains a pair of lenses.

* * * * *